United States Patent Office 3,317,590
Patented May 2, 1967

3,317,590
PREPARATION OF UNSATURATED CARBOXYLIC
ACIDS
Louis Schmerling, Riverside, Ill., assignor to Universal Oil Products Company, Des Plaines, Ill., a corporation of Delaware
No Drawing. Filed Nov. 12, 1963, Ser. No. 323,053
20 Claims. (Cl. 260—514)

This invention relates to the preparation of unsaturated carboxylic acids. It is an object of this invention to present a novel method of preparing unsaturated carboxylic acids, particularly carboxylic acids containing alpha-beta unsaturation.

In one of its broad aspects, the present invention relates to a method of preparing an unsaturated carboxylic acid which comprises heating a haloalkane at a temperature of from about 100° C. to about 300° C. in contact with a salt of a carboxylic acid selected from the group consisting of alkali metal and alkaline earth metal salts and acidifying the reaction product. The aforesaid haloalkane must contain at least two halogen atoms, which may be chlorine and/or bromine atoms, attached to the same carbon atom, and the aforesaid carboxylic acid must contain at least two hydrogen atoms attached to the same alpha carbon atom thereof. The carboxylic acid salts herein utilized as starting materials are converted to carboxylic acids containing at least one more carbon atom in the form of an alkylidene group, usually a methylidene group, attached to an alpha carbon atom. The products prepared in accordance with the method of this invention, are, in general, useful in the manufacture of valuable resins and polymers. For example, methacrylic acid and its derivatives readily polymerize in the presence of light, heat, or a catalyst to form clear, transparent resins characterized by high tensile and impact strength, all of which lead to important applications, for example, in the field of optics.

One of the more specific embodiments of this invention is in a method of preparing methacrylic acid which comprises heating methylene chloride at a temperature of from about 150° C. to about 250° C. in contact with sodium propionate and acidifying the resultant reaction mixture.

Other objects and embodiments of this invention will become apparent in the following detailed specification.

The alkali metal salts and alkaline earth metal salts of saturated carboxylic acids utilized as starting materials must contain at least 2 hydrogen atoms attached to the same alpha carbon atom to be operable in accordance with the method of this invention. Of the alkali metal salts and alkaline earth metal salts, i.e., lithium, sodium, potassium, rubidium, cesium, beryllium, magnesium, calcium, strontium, and barium salts, the alkali metal salts, particularly the sodium and potassium salts, are preferred. Suitable salts of saturated carboxylic acids thus include sodium acetate, potassium acetate, sodium propionate, potassium propionate, sodium butanoate, potassium butanoate, sodium 3-methylbutanoate, potassium 3-methylbutanoate, sodium pentanoate, potassium pentanoate, sodium 4-methylpentanoate, potassium 4-methylpentanoate, sodium hexanoate, potassium hexanoate, sodium heptanoate, potassium heptanoate, sodium octanoate, potassium octanoate, sodium nonanoate, potassium nonanoate, sodium decanoate, potassium decanoate, etc., preferably the sodium and potassium salts of the normal or straight chain alkanoic acids. Suitable saturated carboxylic acid salts also include the alkali metal and alkaline earth metal salts of cycloalkylalkanoic acids, for example, sodium cyclopentylacetate, potassium cyclopentylacetate, sodium cyclohexylacetate, potassium cyclohexylacetate, sodium 3-cyclopentylpropionate, potassium 3-cyclopentylpropionate, sodium 3-cyclohexylpropionate, potassium 3-cyclohexylpropionate, sodium (methylcyclopentyl)acetate, etc. Alkaline earth metal salts of dicarboxylic acids as well as the dialkali metal salts are also within the scope of this invention, provided that they contain at least two hydrogen atoms attached to the same alpha carbon atom adjacent to a carboxylate group. Operable salts of dicarboxylic acids thus include disodium malonate, dipotassium malonate, disodium succinate, dipotassium succinate, disodium glutarate, dipotassium glutarate, as well as the sodium and potassium salts of adipic acid, pimelic acid, suberic acid, azelaic acid, sebacic acid, and the like. The alkali metal or alkaline earth metal salts of aryl substituted alkanoic acids, when treated in accordance with the method of this invention, react in much the same manner as the described salts of saturated carboxylic acids and, for the purpose of this invention, are considered as being within the generic description "alkali metal and alkaline earth metal salts of saturated carboxylic acids" herein employed. Examples of suitable salts of arylalkanoic acids include sodium phenylacetate, potassium phenylacetate, sodium α-naphthylacetate, potassium α-naphthylacetate, sodium β-naphthylacetate, potassium β-naphthylacetate, sodium 3-phenylpropionate, sodium 3-phenylbutanoate, sodium 4-phenylpentanoate, etc.

Pursuant to the method of this invention, a haloalkane is heated at a temperature of from about 100° C. to about 300° C. in contact with an alkali metal salt or an alkaline earth metal salt of a saturated carboxylic acid more fully described in the previous paragraph. On acidification, the reaction product is converted to a carboxylic acid containing at least one more carbon atom in the form of an alkylidene group attached to an alpha carbon atom to give a carboxylic acid containing alpha-beta unsaturation. The nature of the alkylidene group is determined by the particular haloalkane utilized as a starting material. It is essential that the haloalkane contain at least two halogen atoms attached to the same carbon atom. The halogen atoms can be chlorine or bromine, or a combination thereof. In the course of the reaction hydrogen chloride, or hydrogen bromide as the case may be, is eliminated, and the alkyl group of the haloalkane becomes doubly bonded to the carboxylic acid salt, the point of attachment being between the carbon atom which formerly held the halogen atoms and the alpha carbon atom of the carboxylic acid salt. Thus, where the reactants are 1,1-dibromoethane and potassium propionate, the reaction product is 2-methyl-2-butenoic acid. Methylene halides, i.e., methylene chloride and methylene bromide, are preferred haloalkanes.

One preferred embodiment of this invention concerns the aforementioned preparation of methacrylic acid on heating methylene chloride at a temperature of from about 150° C. to about 250° C. in contact with sodium propionate and acidifying the resultant reaction mixture. Another preferred embodiment relates to the preparation of α-propylacrylic acid by heating the methylene chloride at a temperature of from about 150° C. to about 250° C. in contact with sodium pentanoate and acidifying the resultant reaction mixture. Still another preferred embodiment is in the preparation of α-methylene-succinic acid by heating methylene chloride at a temperature of from about 150° C. to about 250° C. in contact with dipotassium succinate and acidifying the resultant reaction mixture. Other preferred embodiments relate to the use of methylene bromide in the preparation of α-cyclohexylacrylic and α-phenylacrylic acid. In the first instance methylene bromide is heated with sodium cyclohexylacetate, and in the second instance, with potassium phenylacetate. In either case the preferred temperature is from about 150° C. to about 250° C., the desired products being recovered from an acidified reaction mixture.

Other haloalkanes operable in accordance with the method of this invention, although not necessarily with the same or equivalent results, include other halomethanes like carbon tetrachloride, carbon tetrabromide, chloroform, bromoform, and also haloalkanes such as 1,1-dichloroethane, 1,1-dibromomethane, 1,1-dichloropropane, 1,1-dibromopropane, 2,2-dichloropropane, 2,2-dibromopropane, 1,1-dichlorobutane, 1,1-dibromobutane, 1,1-dichloro-3,3-dimethylbutane, 1,1-dibromo-3,3-dimethylbutane, etc., and also halocycloalkanes like 1,1-dichlorocyclopentane, 1,1-dibromocyclopentane, 1,1-dichlorocyclohexane, 1,1-dibromocyclohexane, etc.

Reaction conditions relate principally to temperature. The condensation reaction herein disclosed can be effected in the vapor phase as well as in the liquid phase. However, a liquid phase reaction is preferred. Consequently, the pressure at which the reaction is conducted is chosen accordingly and in some cases may be simply atmospheric, or autogenous pressure developed during the course of the reaction, or an imposed pressure to facilitate a process flow. In accordance with the present method, the selected haloalkane is heated at a temperature of from about 100° C. to about 300° C. in contact with a selected salt of a carboxylic acid. Temperatures in the higher range, and in excess of about 300° C., tend toward decomposition of the reactants as well as the desired product. It is preferred to utilize a temperature in the more limited range of from about 150° C. to about 250° C., the optimum temperature in any particular case being dependent on the stability of the selected reactants as well as the desired product.

The method of this invention can be effected in any conventional or otherwise convenient manner and may comprise either a batch type or a continuous type of operation. For example, when it is desired to prepare the unsaturated carboxylic acid by batch methods, a quantity of the alkali metal salt, or alkaline earth metal salt of an appropriate carboxylic acid, is sealed in a suitable apparatus, such as an autoclave equipped with adequate mixing and heating means, together with the selected haloalkane. The reaction may be carried out at a predetermined pressure by the inclusion of an inert gas, such as nitrogen, in the reaction mixture. The reaction mixture is maintained at the desired temperature for a suitable period while maintaining the reactants in an agitated state. At the expiration of a suitable reaction period the reaction mixture is cooled to about room temperature and vented to the atmosphere. The reaction mixture is acidified and the reaction product recovered by conventional means. Acidification may be by the addition of water to the reaction mixture which contains hydrogen chloride or hydrogen bromide evolved during the reaction. The products of the reaction are recovered by conventional means as, for example, dissolving the reaction mixture in water and extracting the reaction products from the aqueous with ether. The desired product can be recovered from the ether extract by fractional distillation of the extract.

The following examples are presented in further illustration of the novelty and utility of this invention but not with the intention of unduly limiting the generally broad scope of the same as set out in the appended claims.

Example I

In the preparation of methacrylic acid, about a 15% yield is obtained on heating ⅓ mole of sodium propionate with ¾ mole of methylene chloride in a glass liner in an 850 cc. capacity, rotating autoclave. The autoclave is pressured to about 50 atm. with nitrogen and gradually heated to 200° C. over a 5 hour period. The reaction mixture is thereafter treated with water or dilute hydrochloric acid and the resulting acidic solution is ether extracted. The ether extract is dried over anhydrous sodium sulfate and distilled. Nuclear magnetic resonance analysis indicates that fractions boiling in the 143–163° C. range consist of propionic acid and the desired methacrylic acid, the amount of methacrylic acid increasing with the boiling point of the fractions.

Example II

α-propylacrylic acid is prepared by charging ½ mole of sodium pentanoate and 1 mole of methylene chloride to a glass liner in a rotating autoclave of about 850 cc. capacity and sealing the reactants therein at a pressure of about 25–50 atms. of nitrogen. The autoclave is rotated for about a 5 hour period during which the temperature is brought to 200° C. The reactants are heated at this temperature for an additional ½ hour and then cooled to about room temperature. The reaction mixture is treated with water or dilute hydrochloric acid and the resulting acidic solution is ether extracted. The α-propylacrylic acid is recovered by distillation of the ether exract.

Example III

In the preparation of α-methylenesuccinic acid, methylene chloride and dipotassium succinate are charged to a glass liner in a rotating autoclave in a 1.5–2 to 1 mole ratio and sealed therein under 25–50 atms. of nitrogen. The autoclave is rotated and heated at 180° C. over a period of 5 hours. Thereafter, the autoclave contents are recovered and treated with dilute hydrochloric acid. The resulting acidic solution is extracted with ether and the ether extract is dried and distilled at reduced pressure to yield the desired α-methylenesuccinic acid.

Example IV

An approximately equimolar mixture of methylene bromide and sodium cyclohexylacetate is sealed in a glass liner in a rotating autoclave and approximately 50 atms. of nitrogen is charged thereto. The autoclave and contents are heated at a temperature of about 180° C. for a period of about 5 hours. At the end of the period the autoclave is cooled to room temperature and vented to the atmosphere. Water is added to the reaction mixture and the product is extracted with ether. The ether extract is dried and distilled at reduced pressure to yield α-cyclohexylacrylic acid.

Example V

This example describes the preparation of α-phenylacrylic acid. About 2 moles of methylene bromide is admixed with about 1 mole of potassium phenylacetate in an 850 cc. glass lined autoclave and sealed therein together with about 50 atms. of nitrogen. The reactants are heated together in the rotating autoclave for a period of about 5 hours, the temperature being about 200° C. At the expiration of the stated period, the autoclave is cooled and vented to the atmosphere. Dilute hydrobromic acid is added to the reaction mixture and the resulting acid solution is ether extracted. The ether extract is dried and distilled to yield the desired product.

The method of this invention can also be effected in a continuous manner. In this type of operation, the starting materials are continuously charged to a reactor maintained at a proper temperature and at a desired pressure. The reactants can be charged in separate streams or combined in the desired ratio and charged in a single stream. The reactor may comprise an unpacked vessel or coil or it may contain an adsorbent packing material such as alumina, dehydrated bauxite, fire brick, and the like. The reactor effluent is withdrawn at a rate which will insure an adequate residence time and charged to a second reactor wherein it is treated with water or dilute acid continuously charged thereto. The resulting aqueous solution is recovered and extracted, as with ether, and the extract distilled to yield the desired product.

I claim as my invention:

1. A method of preparing an unsaturated carboxylic acid, which method comprises heating a halolkane at a temperature of from about 100° C. to about 300° C. in contact with a carboxylic acid salt selected from the group consisting of alkali metal and alkaline earth metal salts of alkanoic, cycloalkylalkanoic and arylalkanoic acids, and acidifying the resultant reaction product, the aforesaid haloalkane containing at least two halogen atoms selected from the group consisting of chlorine and bromine attached to the same carbon atom, and the aforesaid carboxylic acid salt containing at least two hydrogen atoms attached to the same alpha carbon atom thereof.

2. The method of claim 1 further characterized in that said haloalkane is a halomethane.

3. Claim 2 further characterized in that said halomethane is a methylene halide.

4. A method of preparing an alkenoic acid, which method comprises heating a haloalkane at a temperature of from about 150° C. to about 250° C. in contact with an alkali metal salt of an alkanoic acid and acidifying the resultant reaction product, the aforesaid haloalkane containing at least two halogen atoms selected from the group consisting of chlorine and bromine attached to the same carbon atom, and the aforesaid alkanoic acid salt containing at least two hydrogen atoms attached to the same alpha carbon atom thereof.

5. The method of claim 4 further characterized in that said haloalkane is a halomethane.

6. The method of claim 5 further characterized in that said halomethane is a methylene halide.

7. A method of preparing an alkenoic acid, which method comprises heating haloalkane at a temperature of from about 150° C. to about 250° C. in contact with an alkali metal salt of a straight-chain alkanoic acid and acidifying the resultant reaction product, the aforesaid haloalkane containing at least two halogen atoms selected from the group consisting of chlorine and bromine attached to the same carbon atom, and the aforesaid straight-chain alkanoic acid salt containing at least two hydrogen atoms attached to the same carbon atom thereof.

8. The method of claim 7 further characterized in that said haloalkane is a halomethane.

9. The method of claim 8 further characterized in that said halomethane is a methylene halide.

10. A method of preparing a cycloalkylalkenoic acid, which method comprises heating a haloalkane at a temperature of from about 150° C. to about 250° C. in contact with an alkali metal salt of a cycloalkylalkanoic acid and acidifying the resultant reaction product, the aforesaid haloalkane containing at least two halogen atoms selected from the group consisting of chlorine and bromine attached to the same carbon atom, and the aforesaid cycloalkylalkanoic acid salt containing at least two hydrogen atoms attached to the same alpha carbon atom thereof.

11. The method of claim 10 further characterized in that said haloalkane is a halomethane.

12. The method of claim 11 further characterized in that said halomethane is a methylene halide.

13. A method of preparing an arylalkenoic acid, which method comprises heating a haloalkane at a temperature of from about 150° C. to about 250° C. in contact with an alkali metal salt of an arylalkanoic acid, and acidifying the resultant reaction product, the aforesaid haloalkane containing at least two halogen atoms selected from the group consisting of chlorine and bromine attached to the same carbon atom, the aforesaid arylalkenoic acid salt containing at least two hydrogen atoms attached to the same alpha carbon atom thereof.

14. The method of claim 13 further characterized in that said haloalkane is a halomethane.

15. The method of claim 14 further characterized in that said halomethane is a methylene halide.

16. A method of preparing methacrylic acid which comprises heating methylene chloride at a temperature of from about 150° C. to about 250° C. in contact with sodium propionate and acidifying the resultant reaction mixture.

17. A method of preparing α-propylacrylic acid which comprises heating methylene chloride at a temperature of from about 150° C. to about 250° C. in contact with sodium pentanoate and acidifying the resultant reaction mixture.

18. A method of preparing α-methylenesuccinic acid which comprises heating methylene chloride at a temperature of from about 150° C. to about 250° C. in contact with dipotassium succinate and acidifying the resultant reaction mixture.

19. A method of preparing α-cyclohexylacrylic acid which comprises heating methylene bromide at a temperature of from about 150° C. to about 250° C. in contact with sodium cyclohexylacetate and acidifying the resultant reaction mixture.

20. A method of preparing α-phenylacrylic acid which comprises heating methylene bromide at a temperature of from about 150° C. to about 250° C. in contact with potassium phenylacetate and acidifying the resultant reaction mixture.

No references cited.

LORRAINE A. WEINBERGER, *Primary Examiner.*

R. K. JACKSON, *Assistant Examiner.*